(12) United States Patent
Sanders et al.

(10) Patent No.: US 7,080,640 B2
(45) Date of Patent: Jul. 25, 2006

(54) PORTABLE COOKING GRILL HAVING COLLAPSIBLE AND EXTENDABLE FRAME

(76) Inventors: Larry E. Sanders, 9047 N. Matus Ave., Fresno, CA (US) 93720; Heidi M. Sanders, 9047 N. Matus Ave., Fresno, CA (US) 93720

( * ) Notice: Subject to any disclaimer, the term of this patent is extended or adjusted under 35 U.S.C. 154(b) by 0 days.

(21) Appl. No.: 10/992,975

(22) Filed: Nov. 18, 2004

(65) Prior Publication Data

US 2006/0102163 A1    May 18, 2006

(51) Int. Cl.
F24B 3/00    (2006.01)

(52) U.S. Cl. ............. 126/30; 129/9 B; 129/304 A; 129/333; 211/149; 211/195; 99/449

(58) Field of Classification Search ............. 126/30, 126/29, 9 R, 9 B, 304 R, 304 A, 333; 211/153, 211/149, 195, 186, 132.1, 126.6, 130.1; 108/169, 108/166, 132, 115, 35, 38; 99/449
See application file for complete search history.

(56) References Cited

U.S. PATENT DOCUMENTS

| | | | | |
|---|---|---|---|---|
| 589,056 | A | * | 8/1897 | White .................... 108/148 |
| 718,714 | A | | 1/1903 | Larson |
| 1,054,188 | A | | 2/1913 | Ehmann |
| 1,309,049 | A | | 7/1919 | Syrett |
| 1,435,747 | A | * | 11/1922 | Seiling .................... 126/30 |
| 1,484,476 | A | * | 2/1924 | Currie .................... 248/439 |
| 2,211,924 | A | * | 8/1940 | Forster .................... 126/39 B |
| 2,631,579 | A | | 3/1953 | Metzger |
| 3,149,623 | A | | 9/1964 | Orr, Jr. |
| 3,191,592 | A | * | 6/1965 | Lorbacher .................... 126/25 A |
| 3,330,204 | A | | 7/1967 | Little |
| 3,450,025 | A | | 6/1969 | Fleming |
| 3,523,508 | A | * | 8/1970 | Louis .................... 108/147.13 |
| 3,998,170 | A | * | 12/1976 | Gordon .................... 108/91 |
| D243,436 | S | | 2/1977 | Vida |
| 4,109,567 | A | | 8/1978 | Gage et al. |
| 4,138,953 | A | * | 2/1979 | Tashman .................... 108/147.13 |
| 4,178,844 | A | | 12/1979 | Ward et al. |
| D256,316 | S | | 8/1980 | Nichols, Jr. |
| 4,475,528 | A | | 10/1984 | Kuchenbrod |
| 4,553,523 | A | | 11/1985 | Stohrer, Jr. |
| 4,589,399 | A | | 5/1986 | Hamill et al. |
| 4,696,282 | A | * | 9/1987 | Incitti .................... 126/9 R |

(Continued)

FOREIGN PATENT DOCUMENTS

WO    WO 2005006929 A1 *    1/2005

*Primary Examiner*—Carl D. Price
*Assistant Examiner*—James G. Barrow
(74) *Attorney, Agent, or Firm*—Richard A. Ryan

(57) ABSTRACT

A portable cooking grill that is configured with a collapsible frame having telescoping legs and a pair of frame sections that extend outwardly to allow the user to adjust the height of the grilling surface and the size of the frame is disclosed. Each frame section has a pair of telescoping legs pivotally connected to the ends of side support rails which support a grill insert, having a pair of foldably connected grill sections, that forms the grilling surface. The legs include a securing mechanism suitable for securing the legs at the height desired by the user. The side support rails slidably engage grill supports located at the sides of the grill insert to extend the position of the legs outwardly. A locking mechanism locks the legs in either their upstanding or folded positions. A slidable connecting mechanism locks the legs in or between the retracted and extended positions.

20 Claims, 4 Drawing Sheets

U.S. PATENT DOCUMENTS

| | | |
|---|---|---|
| 4,920,950 A | 5/1990 | Johnson |
| 4,977,824 A | 12/1990 | Shinler |
| 5,133,333 A | 7/1992 | Stout |
| 5,287,844 A | 2/1994 | Fieber |
| 5,331,904 A * | 7/1994 | DiSimone et al. ............ 108/44 |
| 5,452,706 A | 9/1995 | Meza |
| D370,387 S | 6/1996 | Dorvall et al. |
| 5,638,742 A * | 6/1997 | Kassaseya ................... 99/426 |
| 5,713,344 A | 2/1998 | Gilbert |
| 6,065,394 A * | 5/2000 | Gelderman ................... 99/449 |
| 6,131,560 A | 10/2000 | Healy |
| 6,135,014 A | 10/2000 | Chang |
| 6,279,467 B1 | 8/2001 | Tiemann |
| 6,439,111 B1 * | 8/2002 | Lu ............................... 99/449 |
| 6,457,594 B1 | 10/2002 | Tiemann |
| 6,546,851 B1 | 4/2003 | Osborne |
| 6,681,759 B1 | 1/2004 | Bentulan |

* cited by examiner

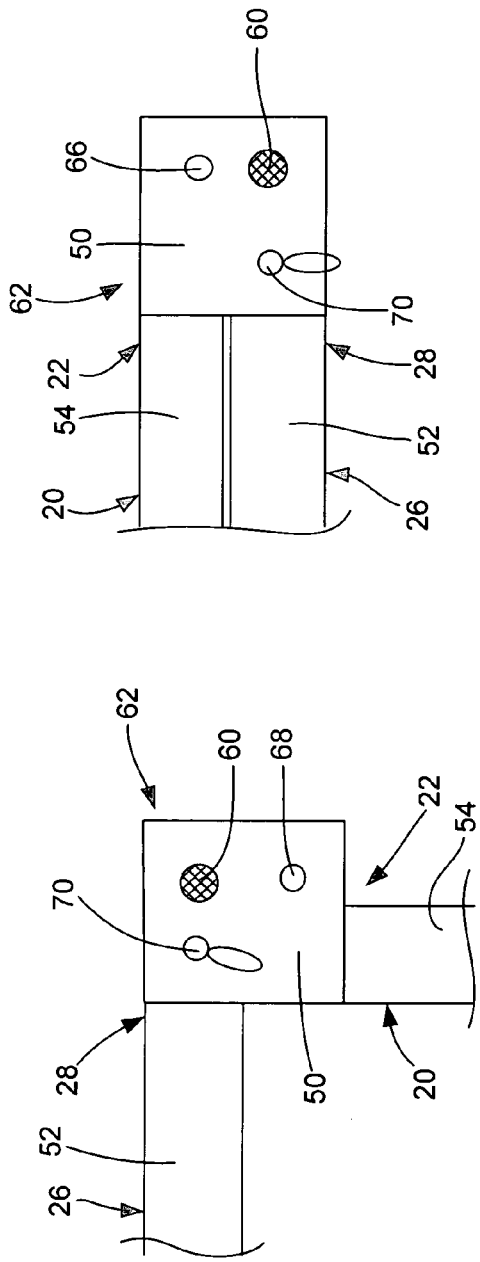
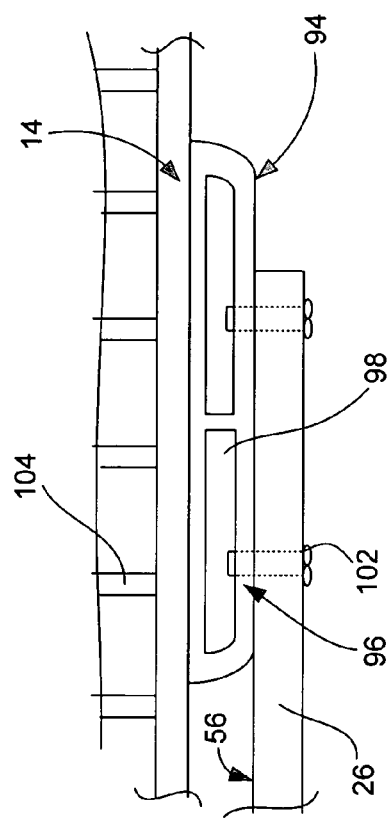

PORTABLE COOKING GRILL HAVING COLLAPSIBLE AND EXTENDABLE FRAME

CROSS-REFERENCE TO RELATED APPLICATIONS

None.

BACKGROUND OF THE INVENTION

A. Field of the Invention

The field of the present invention relates generally to portable apparatuses used for grilling or barbequing food over a fire or other source of heat. More particularly, the present invention relates to such apparatuses that are configured to be collapsible and foldable for ease of portability and storage. Even more particularly, the present invention relates to such apparatuses that are adjustable in length and height for use over different sizes of heat sources or variable placement of the grill surface relative to the heat source.

B. Background

Many people enjoy cooking various types of food on a grilling surface over an open fire, charcoal or other sources of heat. As is well known, this type of cooking is commonly referred to as grilling or barbequing. The grilling surface typically comprises a plurality of interconnected, spaced apart and generally parallel transverse rods or bars that form a grate on which the food is cooked. Alternatively, the grilling surface may comprise a ribbed surface or a generally flat, griddle-type of surface. Many home, restaurant and other cooking locations grill the food to obtain certain flavor and health benefits that are well known to be associated with grilling food. At home, many people utilize outdoor barbeque grills, with the heat supplied by gas, charcoal, wood or other fuel, to cook their food. While grilling of food is popular both at and away from the home, outdoor enthusiasts such as hunters, campers, hikers, recreational vehicle users and the like particularly tend to utilize and enjoy grilling their food. Although some of this popularity has to do with the lack of a non-grilling cooking device, such as an oven or stove, that is suitable or efficient for cooking food outdoors, much of the popularity of grilling has to do with the availability of fuel (such as wood), the taste of grilled foods, the avoidance of inside cooking odors and the overall enjoyment of the outdoor experience. For this reason, even those outdoor enthusiasts who do have ovens or stoves readily available, such as recreational vehicle users and many camper units, often prefer to grill their food over an open fire-type of heat source outside the recreational vehicle or other camp vehicle.

With regard to grilling of food at outdoor camping locations, many such locations have a fire pit or the like provided for the outdoor enthusiast to use to grill food. In many areas of the country, if the person staying at the area desires to grill his or her food, use of the provided fire pit is mandatory, as opposed to making their own fire pit, for aesthetic and fire safety reasons. Fire pits commonly have side walls formed from one or more different types of materials, including steel rings, rocks, concrete, bricks and other materials, that are suitable for substantially enclosing the cooking fire therein. Often, the material for the fire pit side walls is selected from materials that are commonly available or otherwise associated with the particular location. Although the typical fire pit is generally circular in shape, fire pits are known to come in other shapes, including square, rectangular and various multi-faceted shapes. Depending on the area where the fire pit is located or on the personal preferences of the fire pit builder, the height of the fire pit side walls may vary somewhat from one location to another, or even from one campground to other campgrounds in the same area. Some fire pits may be built substantially into the ground, while others may have side walls that stand twelve, eighteen, twenty-four inches, or even more, above the ground.

Unless the food is to be cooked over the fire or other heat source utilizing a skewer, such as one would do with hot dogs or marshmallows, the typical user of the fire pit places a grilling surface on the fire pit walls or other supporting structure such that the grilling surface is substantially over the fire for cooking his or her food. Some fire pits have grilling surfaces available for the user to use with the fire pit. In fact, some of these provided grilling surfaces are hingedly connected to the fire pit wall such that they can be folded over the fire to provide a secure surface for grilling the food. For a variety of taste, health and sanitary reasons, however, many outdoor enthusiasts do not utilize the provided grilling surface and instead choose to utilize their own grilling surface for cooking. The problem the outdoor enthusiast faces with providing his or her own grilling surface is at least two-fold, namely being able to store the grilling surface when it is not in use and having a properly sized grilling surface for the fire pit or other cooking area. Because it is very difficult to guess or know in advance the size of grilling surface that can be utilized with a particular fire pit or other cooking area, the outdoor enthusiast either must bring more than one grilling surface to accommodate different size fire pits, modify the fire pit to fit his or her grilling surface or otherwise make the grilling surface and fire pit cooperate to provide a secure grilling surface (i.e., one that will not fall into the fire with the food on it). Bringing multiple sizes of grilling surfaces is not usually a practical solution and many fire pits cannot be easily modified, such as by moving the fire pit side walls, to securely support the grilling surface. Even when the grilling surface can be supported by the fire pit side walls or other supporting structures, use of the side walls or support structure fixes the height of the grilling surface relative to the fire or other heat source. Many persons consider this to be a major disadvantage to use of fire pits because it does not provide the user with any flexibility with regard to how close he or she can place the grilling surface, and therefore the food cooking on the grilling surface, to the heat from the heat source. As well known to most persons, this flexibility is desired so that the user may control how fast or slow the food will cook and to what extent the heat source is able to sear or not sear the cooking food.

One alternative the outdoor enthusiast has to using a provided fire pit and his or her own grilling surface is to utilize a barbeque unit, which usually has a "built-in" grilling surface and is similar in configuration to the typical home unit, that can be brought to the cooking location by the camping vehicle, recreational vehicle or other vehicle. Unfortunately, use of the home-type of barbeque units is generally not very practical due to the size of such units and the storage space available to the outdoor enthusiast for carrying the necessary materials and equipment to the camping location. In addition, many such units can be difficult to load and unload from the vehicle due to their size, weight and/or shape. As such, the typical outdoor enthusiast does not utilize these types of barbeque units for his or her grilling purposes.

Portable grills suitable for use over a fire or other heat source, with or without a built-in or established fire pit, are well known in the prior art. In fact, a number of patents have issued for such devices. Representative of such portable grills is U.S. Pat. No. 6,131,560 to Healy, which discloses a portable grill having telescoping legs that extend for use of the grill over an open fire or other heat source and which fold to allow the grill to be easily transported in a case or other carrying unit. U.S. Pat. No. 5,452,706 to Meza and U.S. Pat. No. 4,977,824 to Shinler disclose roll-up cooking grills that are suitable for providing a flat surface over a heat source and then being rolled into a bundle for storage and transport. U.S. Pat. No. 4,589,399 to Hamill, U.S. Pat. No. 4,475,528 to Kuchenbrod, U.S. Pat. No. 1,309,049 to Syrett and U.S. Pat. No. 718,714 to Larson are examples of cooking grills that have foldable grilling surfaces that are supported above the fire for cooking and which are folded to provide a more compact unit for storage and transport. U.S. Pat. No. 6,279,467 to Tiemann, U.S. Pat. No. 4,553,523 to Stohrer and U.S. Pat. No. 4,178,844 to Ward are examples of cooking grids, racks or grates that are configured to allow the unit to expand in one or more directions. U.S. Pat. No. 6,681,759 to Bentulan discloses a home-type of barbeque grill apparatus that is configured to expand and contract so as to increase or decrease the cooking surface area. U.S. Pat. No. 4,920,950 to Johnson is an example of a camp stove or grill that has legs which fold relative to the grilling surface for storage and transport. U.S. Pat. No. 6,546,851 to Osborne describes a portable cooking grill that is configured to be substantially disassembled for storage and transport.

While the prior art teaches a variety of features and configurations for portable cooking grills, none of the known references teach or suggest the unique structural features of the portable cooking grill of the present invention. Specifically, the prior does not teach, whether taken singularly or in combination, a portable cooking grill that is configured for use over a fire or other heat source that is sufficiently versatile for use with a variety of different sized fire pits or other cooking areas and which is easily collapsed for storage and transport. What is needed, therefore, is a portable cooking grill that provides a substantially flat grilling surface above a fire or other heat source that is adjustable in length to accommodate different sized fire pits or cooking areas, adjustable in height to allow the user to adjust for how close he or she wants or needs the food to be to the fire and substantially collapsible for ease of storage and transport. A preferred portable cooking grill will include a frame system that is configured to support one or more grilling surfaces, extend as necessary for different sizes of fire pits and fold for storage. The preferred portable cooking grill will also comprise telescoping legs to allow the user to adjust the height of the cooking surface relative to the fire or other heat source over which the food will be grilled. The preferred portable cooking grill will be easy for the typical user to set-up for cooking and collapse for storage/transport. The preferred portable cooking grill will also be adaptable for using replaceable grilling inserts to provide different types of grilling surfaces such that the user can choose the type of grilling surface he or she believes to be the most beneficial for the type of food to be cooked (i.e., hamburgers or steak versus pancakes or eggs).

SUMMARY OF THE INVENTION

The portable cooking grill of the present invention solves the problems and provides the benefits identified above. That is to say, the present invention discloses a new portable cooking grill having a collapsible and extendable frame to allow the user to easily store and transport the cooking grill and adapt it for different sizes of fire pits or other cooking areas. In a preferred embodiment of the present invention, the portable cooking grill includes a pair of grill inserts that are hingedly connected so as to provide a substantially flat cooking surface in its cooking position and to be easily folded for ease of storage and transport. The preferred frame has four telescoping legs, to allow adjustment of the height of the grilling surface above the fire or heat source, which are pivotally connected to side support rails in a configuration that allows the legs to fold upward into an abutting relationship with the side support rails for storage and transport. The legs include a securing mechanism to set the height of the grilling surface above the fire and a locking mechanism that locks the legs in either the downward projecting cooking position or the side rail abutting folded position. The preferred grill inserts that form the grilling surface are configured to be replaceable to provide different types of cooking surfaces and to have grill supports on the sides thereof that slidably interact with the side support rails to allow extension of the frame for placement over different sizes of fire pits or other cooking areas. The portable cooking grill of the present invention can be utilized to cook food over an open fire or other heat sources and then collapse and fold for storage and transport. In a preferred embodiment, the grill inserts include handles at the opposing ends of the grilling surface for ease in carrying the collapsed/folded cooking grill or moving the upright cooking grill when it is locked in its cooking position.

In one general aspect of the present invention, the portable cooking grill of the present invention includes a frame having a pair of extendable frame sections that each have a pair of elongated legs and a pair of elongated side support rails. Each of the legs are configured with a first leg member, a second leg member in telescoping cooperation with the first leg member and mechanism for securing the position of the second leg member relative to the first leg member. One end of each of the legs is pivotally connected to one end of the side support rails by a pivoting mechanism, such as a pivot pin. A locking mechanism, which is located at the pivoting mechanism for each leg and side support rail combination, independently locks the first frame section and the second frame section into either a first, upstanding position for cooking or a second folded, position for storage. In the preferred embodiment, the locking mechanism comprises a pair of plates that are attached to either the legs or the side support rails, a first locking aperture on the plates, a second locking aperture on the plates and a removable locking pin. The locking pin is sized and configured to engage the first locking aperture to secure the portable cooking grill in the first position and engage the second locking aperture to secure the portable cooking grill in the second position. A pivot pin also extends between the pair of plates to pivot the legs. The grilling surface is formed by a grill insert having a first grill section and a second grill section that are foldably interconnected. In the preferred embodiment, a hinge interconnects one end of each of the first and second grill sections. To facilitate extension of the portable cooking grill for larger sized fire pits or cooking areas, a first grill support is at the first and second sides of the first grill section and a second grill support is at the first and second sides of the second grill section. Each of the grill supports have a mechanism for slidably interconnecting one of the side support rails to the sides or the respective grill section to extend the legs of the first and second frame sections outwardly. In the preferred embodiment, both the first grill insert and the second grill insert are replaceable to provide different grilling surfaces for cooking different types of food.

Accordingly, the primary objective of the present invention is to provide a portable cooking grill that provides the advantages discussed above and that overcomes the disadvantages and limitations associated with presently available portable cooking grills.

It is also an object of the present invention to provide a portable cooking grill that is collapsible and foldable for ease in carrying and storing, configured to extend outwardly for different sizes of fire pits and provided with legs that raise/lower for positioning of the grilling surface relative to the fire or other heat source.

It is also an object of the present invention to provide a portable cooking grill having telescoping legs that pivotally attach at one end of an extendable side support rail to allow the legs to be extended outwardly during use and to pivot into an abutting relationship for storage and transport.

It is another object of the present invention to provide a portable cooking grill having a grill insert comprised of two or more grill insert sections that are hingedly connected so as to allow the user to place the grill insert in a substantially flat position for cooking and to fold the grill insert for storage and transport.

It is also an object of the present invention to provide a portable cooking grill having a grill insert with grill supports on the sides thereof that are configured to slidably engage the side support rails of the frame to allow the user to extend one or more ends of the cooking grill in order to provide improved positioning of the cooking grill over the fire or other heat source.

It is another object of the present invention to provide a portable cooking grill having securing mechanisms on telescoping legs to secure the height of the grilling surface during use and pivoting/locking mechanisms to lock the legs in either a generally downward, supporting position for use of the cooking grill or a folded position for storage/transport of the cooking grill.

The above and other objectives of the present invention will be explained in greater detail by reference to the attached figures and the description of the preferred embodiment which follows. As set forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention:

FIG. 7 is an isolated side view of the pivoting/locking mechanism of a preferred embodiment of the present invention shown in the cooking position to support the grilling surface above the fire or other heat source;

FIG. 8 is an isolated side view of the pivoting/locking mechanism of a preferred embodiment of the present invention shown in the folded position for ease of storage and transport; and FIG. 9 is an isolated top view of the grill supports and side support rail for allowing extension of the legs that is utilized with the preferred embodiment of the present invention shown in FIG. 1.

DETAILED DESCRIPTION OF THE PREFERRED EMBODIMENTS

With reference to the figures where like elements have been given like numerical designations to facilitate the reader's understanding of the present invention, and particularly with reference to the embodiment of the portable cooking grill of the present invention illustrated in the figures, various preferred embodiments of the present invention are set forth below. The enclosed description and drawings are merely illustrative of preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
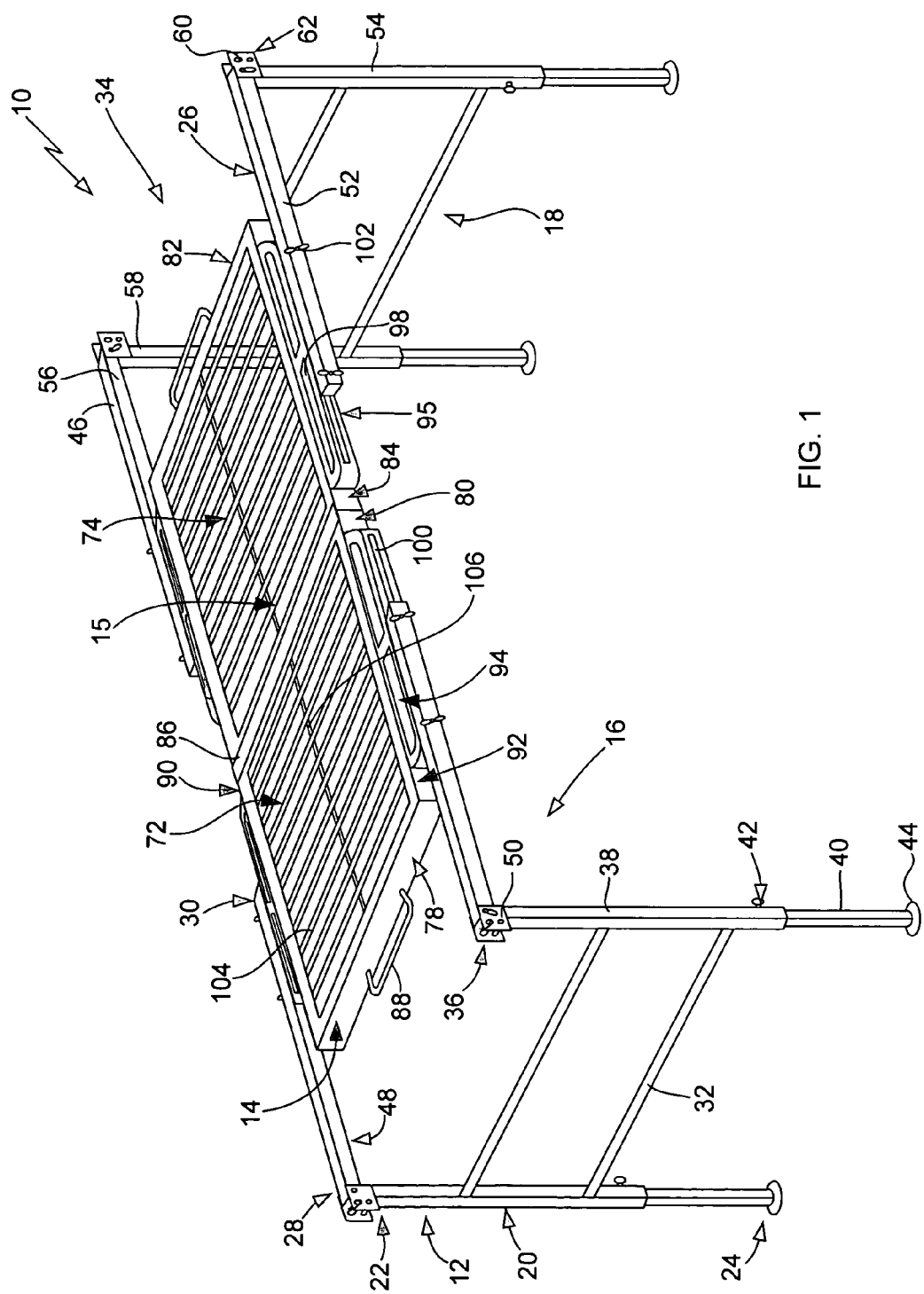
FIG. 1 is perspective view of a portable cooking grill configured according to a preferred embodiment of the present invention shown in its cooking position for placement above a fire or other heat source.

In the preferred embodiment of the portable cooking grill of the present invention, shown in the figures, the portable cooking grill is identified generally as 10 and best shown in FIG. 1. As explained in more detail below, portable cooking grill 10 generally comprises a frame 12 that is configured to securely support grill insert 14 above a fire or other heat source and to be easily collapsed and folded for storage and transport of portable cooking grill 10. As shown in FIG. 1, grill insert 14 is configured to provide the user with a substantially flat, horizontally disposed grilling surface 15 upon which he or she can cook a variety of foods above the fire or other heat source. In the preferred embodiment, frame 12 comprises first frame section 16 and second frame section 18 that are cooperatively configured to support grill insert 14. First frame section 16 and second frame section 18 each comprise a pair of legs 20, having first end 22 and second end 24, and a pair of side support rails 26, having first end 28 and second end 30. In the preferred embodiment, one or more transverse brace members 32 interconnect each pair of legs 20 to provide additional support for portable cooking grill 10 when used in its first or cooking position 34, as shown in FIG. 1. Also in the preferred embodiment shown in FIG. 1, each of the first ends 22 of legs 20 are pivotally connected to a first end 28 of a side support rail 26 by a pivotally connecting means in the form of the pivot mechanism 36, the description and operation of which is described in more detail below and best shown in FIGS. 5, 7 and 8.

Figure 2:
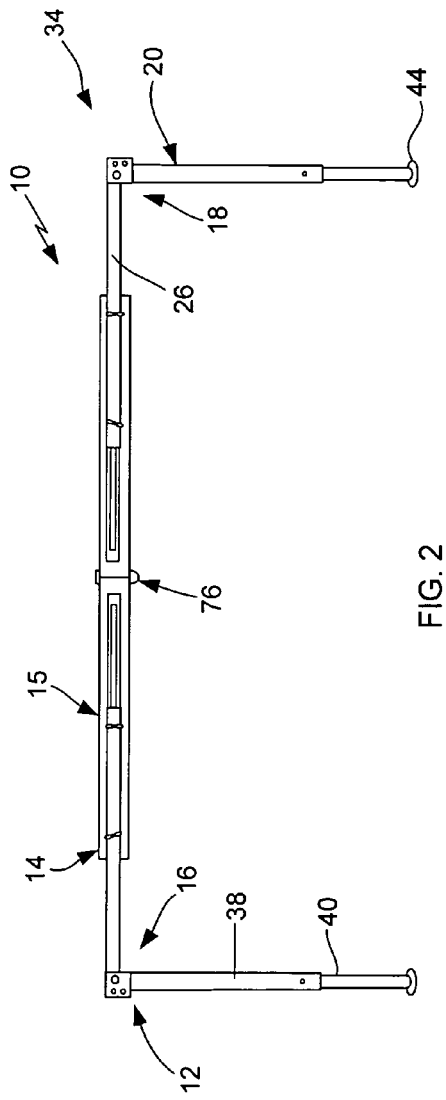
FIG. 2 is a side view of the portable cooking grill of FIG. 1 showing the legs fully telescoped and the side support rails fully extended.
Figure 3:
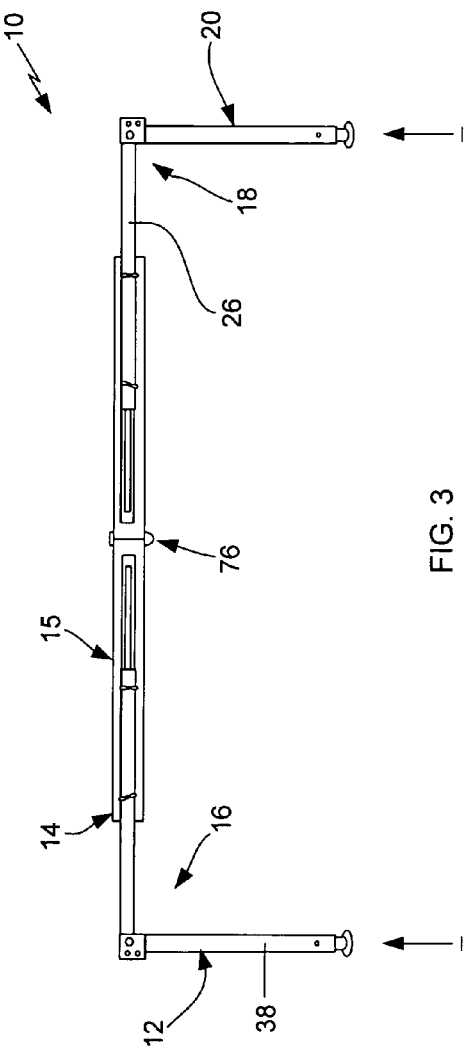
FIG. 3 is a side view of the portable cooking grill of FIG. 2 showing the telescoping legs retracted into their non-telescoped position.
Figure 4:
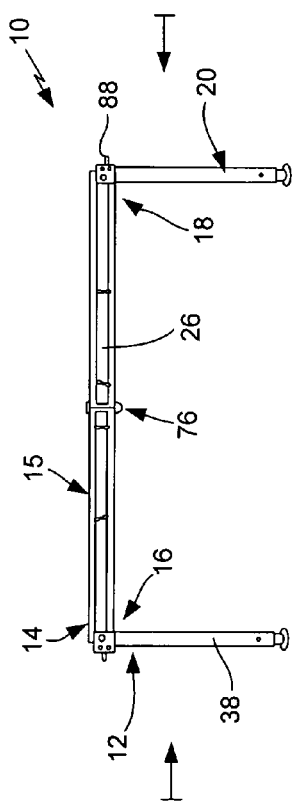
FIG. 4 is a side view of the portable cooking grill of FIG. 3 showing the side support rails retracted into their non-extended position.

The preferred embodiment of the portable cooking grill 10 of the present invention utilizes legs 20 having a first leg member 38 and second leg member 40, which is in telescoping relationship with first leg member 38. In the embodiment shown, first leg member 38 and second leg member 40 are configured such that second leg member 49 is slidably disposed inside of first leg member 38 so that the user can adjust the height of grilling surface 15, defined by grill insert 14, to place the food nearer or further away from the fire or other heat source, as illustrated by the change from FIG. 2 to FIG. 3. To fix the height of grill insert 14 relative to the fire, legs 20 also comprise a means for securing in the form of a securing mechanism 42 to secure the position of second leg member 40 relative to first leg member 38. In one embodiment, securing mechanism 42 is a thumb-type screw that is configured to be threadably received by first leg member 38 and engage second leg member 40 to secure the height of grilling surface 15 in the user's desired position. As known to those skilled in the art, the telescoping relationship between first leg member 38 and second leg member 40 can be reversed (i.e., first leg member 38 slidably disposed in second leg member 40) and a variety of different types of screws, bolts or other tightening mechanisms can be utilized as securing mechanism 42 to secure first 38 and second 40 leg members relative to each other. In addition, although not shown but well known in the art, securing mechanism 42 can comprise a removable pin member that is configured to insertably engage one set of cooperatively disposed holes in first leg member 38 and second leg member 40. As shown in FIG. 1, legs 20 can also include an enlarged area or foot 44 at second end 24 thereof to improve the stability of portable cooking grill 10 when placed in its cooking position 34. Alternatively, second end 24 of leg 20 can comprise a stake-type of end for insertion into the ground.

Figure 5:
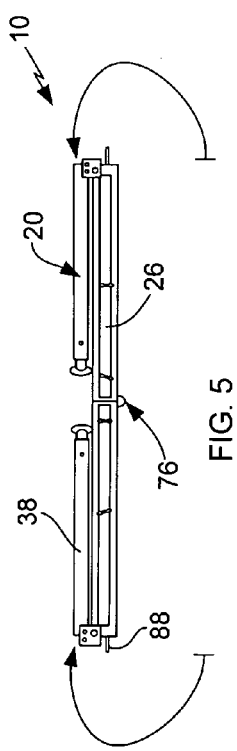
FIG. 5 is a side view of the portable cooking grill of FIG. 4 showing the legs folded upward against the side support rails.

As shown in FIGS. 1 through 5, 7 and 8, first end 22 of each of legs 20 connects to first end 28 of one of the side support rails 26. In the preferred embodiment of the portable cooking grill 10 of the present invention, each leg 20 is pivotally connected to a side support rail 26 by pivot mechanism 36, which is configured to allow leg 20 to pivot outwardly and upwardly, as shown in FIG. 5, until it is folded against the top edge 46 of a side support rail 26. Although pivot mechanism 36 can be configured to pivot leg 20 inwardly and up against the bottom edge 48 of a side support rail 26, the present configuration provides a more compact unit, shown in FIG. 6, with the present folding configuration for grill insert 14. As known to those skilled in the art, a variety of different types of pivot mechanisms 36 can be utilized with portable cooking grill 10 of the present invention. In the preferred embodiment, best shown in FIGS. 1, 7 and 8, pivot mechanism 36 comprises a pair of plate members 50, with one of the plates 50 positioned against the outside edge 52 of side support rail 26 and the outside edge 54 of leg 20 and the other of the plates 50 positioned against the inside edge 56 of side support rail 26 and the inside edge 58 of leg 20 at the junction of first end 22 of leg 20 and first end 28 of side support rail 26, and pivot pin 60 interconnecting plates 50 that is configured to allow leg 20 to generally freely pivot relative to side support rail 26. As known in the art, pivoting members such as pivot pin 60 are configured with a generally cylindrical body having capped ends to secure the body between the pivoting item. In the preferred embodiment, plates 50 are joined to first leg member 38 and pivot therewith.

Figure 6:
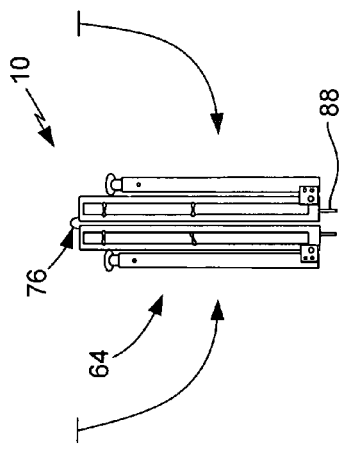
FIG. 6 is a side view of the portable cooking grill of FIG. 5 showing the grill insert folded to place the present invention into its folded position for ease of storage and transport.

The preferred embodiment of the portable cooking grill 10 of the present invention also comprises a means for locking in the form of a locking mechanism, shown generally as 62, to allow the user to lock leg 20 in a generally downwardly projecting direction for the first or cooking position 34, as shown in FIG. 1, or lock leg 20 in a generally flat, folded direction against side support rail 26, as shown in FIG. 5, to achieve the second or folded position 64 shown in FIG. 6. In the preferred embodiment, locking mechanism 62 comprises a pair of aligned first locking apertures 66 for locking legs 20 downward, as shown in FIGS. 1 and 7, a pair of aligned second locking apertures 68 for locking legs 20 in the folded position shown in FIGS. 5 and 8, and a locking pin 70 for engaging either first locking apertures 66 or second locking apertures 68. In the embodiment shown in the figures, locking pin 70 is a standard ring/pull type of pin that is configured to be inserted through first 66 or second 68 locking apertures and secured therein by a ball or other type of member on the opposite side of locking pin 70 from the ring portion. As shown in FIGS. 1 and 7, when portable cooking grill 10 is in the first or cooking position 34 and the user desires to lock leg 20 in a generally downward direction, locking pin 70 is inserted through and secured in first locking apertures 66. As shown in FIGS. 5 and 8, when portable cooking grill 10 is in the second or folded position 64 and the user desires to lock leg 20 in the folded position against side support rail 26, locking pin 70 is inserted through and secured in second locking apertures 68. Use of locking mechanism 62 described above, or an equivalent type of locking mechanism, allows the user to quickly and easily disengage locking mechanism 62 to frame 12 between first/cooking position 34 and second/folded position 64.

As stated above, portable cooking grill 10 of the present invention has a grill insert 14 that provides grilling surface 15. In the preferred embodiment, grill insert 14 comprises a first grill section 72, a second grill section 74 and a means for folding in the form of folding mechanism 76 interconnecting first 72 and second 74 grill sections to allow the user to fold grill insert 14 for more compact storage thereof, as shown in FIG. 6. In the embodiment shown in FIG. 1, first grill section 72 has a first end 78 and a second end 80 and second grill section 74 has a first end 82 and a second end 84. In this embodiment, second end 80 of first grill section 72 is positioned in an adjoining or near-adjoining position with second end 84 of second grill section 74, such that the first ends 78 and 82 of first grill section 72 and second grill section 74, respectively, are facing away from each other. Folding mechanism 76 interconnects second end 80 of first grill section 72 and second end 84 of second grill section 74. In the preferred embodiment, folding mechanism 76 is a hinge or hinge-like member that is configured to allow first grill section 72 and second grill section 74 to fold downwards to the second/folded position shown in FIG. 6. The preferred embodiment also includes a cover plate 86 that is attached to either of first 72 or second 74 grill sections such that when portable cooking grill 10 is in the first/cooking position 34 cover plate 86 covers the joining, or lack thereof, of second end 80 of first grill section 72 and second end 84 of second grill section 74. The preferred embodiment also includes handles 88 at both first end 78 of first grill section 72 and first end 82 of second grill section 74 to assist the user with carrying portable cooking grill 10 when it is in the second/folded position 64 or moving portable cooking grill 10 when it is in the first/cooking position 34. Handles 88 can be fixedly attached to or made integral with first 72 and second 74 grill sections.

As shown in FIG. 1, each of first 72 and second 74 grill sections of grill insert 14 have a first side 90 and a second side 92. In the preferred embodiment, as shown, a first grill support 94 is mounted to, affixed to or integral with first side 90 and second side 92 of first grill section 72 of grill inert 14 and a second grill support 95 is mounted to, affixed to or integral with first side 90 and second side 92 of second grill section 74. As best shown in FIG. 9 with first grill support 94, first 94 and second 95 grill supports are configured to part of a slidably connecting means in the form of a slidable connecting mechanism, shown generally as 96, that slidably connects first 72 and second 74 grill sections of grill insert 14 to side support rails 26 so as to allow the user to extend legs 20 of first frame section 16 and/or legs 20 of second frame section 18 outwardly, thereby extending the size of portable cooking grill 10. This allows portable cooking grill 10 to be adaptable for different sizes of fire pits and other cooking areas. If needed or desired, the user can extend legs 20 outside of the fire pit. Although the preferred embodiment has both first 16 and second 18 frame sections being capable of extension, the portable cooking grill 10 can be configured with one of either first 72 and second 74 grill section having first 94 or second 95 grill support such that only one end of portable cooking grill 10 extends. In the preferred embodiment, the slidable connecting mechanism 96 also includes a pair of vertical channels 98 and a pair of side channels 100 in grill support 94 and, disposed through side channels 100, a pair of slide lock connectors 102, such as lock nuts, to lock the slidable connecting mechanism 96 in place (i.e., fully retracted, fully extended or anywhere in between). In the preferred embodiment, best shown in FIG. 9, slide lock connectors 102 are reachable from above or below through vertical channels 98 and extend through an aperture (not shown) in side channels 100 to connect to a wing nut or other type of connector for relatively easy loosening and tightening of slidable connecting mechanism 96. The inside edge 56 of side support rail 26 slidably abuts against grill support 94 when slide lock connectors 102 are loosened and tightly abuts against grill support 94 when slide lock connectors 102 are tightened. The use of multiple side channels 100 provides a stopping mechanism (i.e., at the inside or outside edge of side channels 100) to prevent side support rails 26 from sliding beyond the ability of grill support 94 to provide the necessary support therefor. As known to those skilled in the art, the length of side channels 100 defines the amount of extension provided for first frame section 16 and/or second frame section 18. Preferably, slide lock connectors 102 are configured such that the user only needs to slightly loosen slide lock connectors 102 to allow side support rails 26 to slide relative to grill insert 14 so as to move first frame section 16 and/or second frame section 18 outwardly.

As stated above, in the preferred embodiment of the present invention grill insert 14 comprises first grill section 72 and second grill section 74. In the embodiment shown in the figures, both first 72 and second 74 grill sections of grill insert 14 have a plurality of interconnected, spaced apart and generally parallel transverse grate rods or bars 104 that form a grate for cooking surface 15 on which the food is cooked. As known to those skilled in the art, cooking surface 15 can comprise a variety of different configurations, including a cross-hatched, ribbed or solid surface, that provide benefits for cooking certain types of foods (for instance, pancakes and eggs generally do better on a solid, griddle-like surface and foods such as bacon and fish do better on a ribbed surface). In addition, grate rods 104 can be spaced closer or further apart as may be desired for different types of cooking styles or foods. Although the user of portable cooking grill 10 of the present invention can place pots or pans directly on cooking surface 15 as desired to cook these foods, the present invention can be modified to utilize a different type of cooking surface for first grill section 72 and/or second grill section 74. For instance, first grill section 72 can comprise the cooking surface 15 shown in the drawings and second grill section 74 can comprise a solid, griddle-like surface to allow the user to cook different types of foods on the first 72 and second 74 grill sections at the same time. In addition, portable cooking grill 10 can utilize replaceable grill inserts 14, such that the grill insert 14 shown in the figures could be replaced with a grill insert 14 having a different configuration (for instance, both first 72 and second 74 grill sections being a solid, griddle-like surface) as desired by the user. To replace grill insert 14, the user would only need to totally disengage slide lock connectors 102, remove grill insert 14 from first frame section 16 and second frame section 18, place the new grill insert 14 in place against side support rails 26 and engage slide lock connectors 102.

The components for portable cooking grill 10 of the present invention can be made out of a variety of different materials, including various metals and composite materials, that are suitable for use in or near a fire or other heat source. In a preferred embodiment, the components for portable cooking grill 10 are made out of steel. Other materials may provide a lighter weight portable cooking grill 10, but generally at a higher cost in order to obtain the necessary fire resistance. In addition, further bracing can be added to portable cooking grill 10 as may be desirable or necessary, depending on the thickness and dimensions of the various components. For instance, grill insert 14 can include grill transverse member 106 to provide additional support to grate rods 104. As known to those skilled in the art, portable cooking grill 10 can be manufactured in various sizes for different types of uses. For instance, portable cooking grill 10 can be made in one version suitable for use with persons having recreational or other camping vehicles and in another version suitable for use with persons who may want to carry portable cooking grill 10 in a backpack. To prevent soot and cooked food that may remain on portable cooking grill 10 after use from coming into contact with persons, belongings or vehicles, the preferred use of the present invention includes a carrying case suitable for receiving and carrying portable cooking grill 10.

In use, the user carries the folded portable cooking grill 10 by handles 88 in its second or folded position 64 to where its use is desired, such as a fire pit at a camping site. The user unfolds portable cooking grill 10 by using handles 88 to unfold folding mechanism 76 and then unlocks legs 20 from their folded position, shown in FIG. 5, by removing locking pin 70 from first locking aperture 66. Once unlocked, legs 20 are pivoted outwardly and then downwardly, as shown in reverse in FIG. 4. The user locks legs 20 in their downward projecting position by placing locking pin 70 into second locking aperture 68 to provide a substantially flat, horizontal grilling surface 15. To extend portable cooking grill 10 for larger sized fire pits or other cooking areas, the user disengages slide lock connector 102 and pulls legs 20 outward to cause side support rails 26 to slide along first 94 and/or second 95 grill supports. Once the desired extension is obtained, the user locks side support rails 26 in position by tightening slide lock connector 102. To raise grilling surface 15 further above the fire or other heat source, the user loosens securing mechanism 42 to allow second leg member 40 to telescopically extend from first leg member 38 until grilling surface 15 is at the desired height. Once grilling surface 15 is at the desired height, the user tightens securing mechanism 42. With the portable cooking grill 10 in its first or cooking position 34, at the appropriate width and height, the user grills his or her food on grilling surface 15. To take down portable cooking grill 10, as shown in FIGS. 2 through 6, the user merely loosens securing mechanism 42 to retract second leg member 40 into first leg member 38, tightens securing mechanism 42 to retain leg 20 in the retracted position, loosens slide lock connector 102 to retract first 16 and second 18 frame sections, tightens slide lock connector 102 to retain side support rails 26 in their retracted position, removes locking pin 70 from first locking aperture 66, folds legs 20 upward and then over onto side support rails 26, places locking pin 70 in second locking aperture 68 to secure legs 20 in their folded position, and then folds first grill section 72 and second grill section 74 at folding mechanism 76 to place portable cooking grill 10 in its second or folded position 64. As will be recognized by those skilled in the art, the order in which portable cooking grill 10 is set up or taken down can be modified (i.e., retract first 16 and second 18 frame sections prior to collapsing second leg member 40 into first leg member 38) as desired by the user.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to assembly, materials, size, shape and use. For instance, some of the components described above can be made integral with each other to reduce the number of separate components and various replacement components can be utilized that perform the same function as those described above.

What is claimed is:

1. A portable cooking grill, comprising:
   a frame having at least two pairs of legs and at least two pairs of side support rails, each of said pair of legs having a first end, a second end, a first leg member and a second leg member in telescoping cooperation with said first leg member, each of said side support rails having a first end and a second end, said first end of said legs pivotally connected to said first end of said side support rails;
   means attached to said legs and/or said side support rails for locking said frame in either a first position extended and open for cooking or and a second position closed for storage folded; and
   a grill insert having a first grill section and a second grill section, each of said first grill section and said second grill section having a first end, a second end, a first side and a second side, said second end of said first grill section foldably connected to said second end of said second grill section, said first side and said second side of at least one of said first grill section and said second grill section slidably connected to said side support rail and configured to extend one pair of said at least two pairs of legs of said frame outwardly.

2. The portable cooking grill according to claim 1 further comprising a hinge interconnecting said second end of said first grill section and said second end of said second grill section.

3. The portable cooking grill according to claim 1 further comprising a handle at said first end of at least one of said first grill section and said second grill section.

4. The portable cooking grill according to claim 1 further comprising means for securing the position of said second leg member relative to said first leg member.

5. The portable cooking grill according to claim 1, wherein said legs are configured to pivot from substantially adjacent to said side support rails in said second position to downward projecting in said first position.

6. The portable cooking grill according to claim 1, wherein said locking means comprises a pair of plates attached to either said legs or said side support rails, a first locking aperture on said plates, a second locking aperture on said plates and a removable locking pin, said locking pin sized and configured to engage said first locking aperture to secure said portable cooking grill in said first position and to engage said second locking aperture to secure said portable cooking grill in said second position.

7. The portable cooking grill according to claim 1 further comprising a first grill support at each of said first side and said second side of said first grill section and/or a second grill support at each of said first side and said second side of said second grill section, each of said first grill support and/or said second grill support having a slide lock connector configured to slidably engage said side support rails and extend one of said two pairs of legs outwardly.

8. The portable cooking grill according to claim 1, wherein at least one of said first grill section and said second grill section comprises a grate having a plurality of substantially parallel disposes grate rods interconnecting said first side and said second side of said of said first grill section and/or said second grill section.

9. The portable cooking grill according to claim 1, wherein at least one of said first grill section and said second grill section is replaceable.

10. A portable cooking grill, comprising:
    a frame having at least two pairs of legs and at least two pairs of side support rails, each of said pair of legs having a first end, a second end, a first leg member, a second leg member in telescoping cooperation with said first leg member and means for securing said first leg member relative to said second leg member, each of said side support rails having a first end and a second end;
    means at said first end of each of said legs for pivotally connecting said first end of one of said legs to said first end of one of said side support rails;
    means at each of said pivotally connecting means for locking said frame in either a first position extended and open for cooking or and a second position closed for storage folded;
    a grill insert having a first grill section and a second grill section, each of said first grill section and said second grill section having a first end, a second end, a first side and a second side;
    means interconnecting said second end of said first grill section to said second end of said second grill section for folding said grill insert;
    a grill support on each of said first side and said second side of at least one of said first grill section and said second grill section; and
    means at each of said grill supports for slidably connecting one of said side support rails to one of said grill supports, said slidably connecting means configured to extend one pair of said at least two pairs of legs of said frame outwardly from said folding means.

11. The portable cooking grill according to claim 10, wherein said locking means comprises a pair of plates attached to either said legs or said side support rails, a first locking aperture on said plates, a second locking aperture on said plates and a removable locking pin, said locking pin sized and configured to engage said first locking aperture to secure said portable cooking grill in said first position and to engage said second locking aperture to secure said portable cooking grill in said second position.

12. The portable cooking grill according to claim 11, wherein said pivotally connecting means comprises a pivot pin disposed through said pair of plates.

13. The portable cooking grill according to claim 10, wherein said folding means is a hinge.

14. The portable cooking grill according to claim 10, wherein at least one of said first grill section and said second grill section is replaceable.

15. The portable cooking grill according to claim 10 further comprising a handle at said first end of at least one of said first grill section and said second grill section.

16. A portable cooking grill, comprising:
a frame having a first frame section and a second frame section, each of said first frame section and said second frame section having a pair of legs and a pair of side support rails, each of said pair of legs having a first end, a second end, a first leg member, a second leg member in telescoping cooperation with said first leg member and means for securing said first leg member relative to said second leg member, each of said side support rails having a first end and a second end;
means at said first end of each of said legs for pivotally connecting said first end of said legs to said first end of one of said side support rails;
means at each of said pivotally connecting means for locking each of said first frame section and said second frame section in either a first position extended and open for cooking and a second position closed for storage folded;
a grill inset having a first grill section and a second grill section, each of said first grill section and said second grill section having a first end, a second end, a first side and a second side;
means interconnecting said second end of said first grill section to said second end of said second grill section for folding said grill insert;
a first grill support on each of said first side and said second side of said first grill section, each of said first grill supports having means for slidably connecting one of said side support rails to said first side of said first grill section and one of said side support rails to said second side of said first grill section, said first grill supports and said slidably connecting means configured to extend said legs of said first frame section outwardly from said folding means; and
a pair of second grill supports on each of said first side and said second side of said second grill section, each of said second grill supports having said slidably connecting means connecting one of said side support rails to said first side of said second grill section and one of said side support rails to said second side of said second grill section, said second grill supports and said slidably connecting means configured to extend said legs of said second frame section outwardly from said folding means.

17. The portable cooking grill according to claim 16, wherein said locking means comprises a pair of plates attached to either said legs or said side support rails, a first locking aperture on said plates, a second locking aperture on said plates and a removable locking pin, said locking pin sized and configured to engage said first locking aperture to secure said portable cooking grill in said first position and to engage said second locking aperture to secure said portable cooking grill in said second position.

18. The portable cooking grill according to claim 17, wherein said pivotally connecting means comprises a pivot pin disposed through said pair of plates.

19. The portable cooking grill according to claim 16, wherein said folding means is a hinge.

20. The portable cooking grill according to claim 16, wherein at least one of said first grill section and said second grill section is replaceable.

\* \* \* \* \*